US007689107B2

(12) United States Patent
Enomoto (10) Patent No.: US 7,689,107 B2
(45) Date of Patent: Mar. 30, 2010

(54) ANTI-SHAKE APPARATUS

(75) Inventor: Shigeo Enomoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 425 days.

(21) Appl. No.: 11/675,865

(22) Filed: Feb. 16, 2007

(65) Prior Publication Data

US 2007/0196085 A1 Aug. 23, 2007

(30) Foreign Application Priority Data

Feb. 20, 2006 (JP) ............................. 2006-042565

(51) Int. Cl.
*G03B 17/00* (2006.01)
*H04N 5/228* (2006.01)
(52) U.S. Cl. ..................... 396/53; 348/208.2; 348/208.7
(58) Field of Classification Search .................... 396/52, 396/53, 55; 79/1.39; 348/208.2, 208.3, 208.7
See application file for complete search history.

(56) References Cited

U.S. PATENT DOCUMENTS

| 4,996,545 | A | * | 2/1991 | Enomoto et al. | ............... | 396/53 |
|---|---|---|---|---|---|---|
| 5,794,078 | A | * | 8/1998 | Okazaki | ....................... | 396/50 |
| 6,747,690 | B2 | * | 6/2004 | Mølgaard | ................ | 348/208.1 |
| 7,292,270 | B2 | * | 11/2007 | Higurashi et al. | ......... | 348/208.3 |
| 2006/0008263 | A1 | * | 1/2006 | Kakiuchi | ..................... | 396/55 |
| 2006/0017818 | A1 | | 1/2006 | Enomoto | | |
| 2006/0284495 | A1 | | 12/2006 | Seo et al. | | |
| 2007/0014555 | A1 | | 1/2007 | Hirunuma et al. | | |
| 2007/0058958 | A1 | | 3/2007 | Enomoto | | |

FOREIGN PATENT DOCUMENTS

| JP | 6-178190 | 6/1994 |
|---|---|---|
| JP | 8-029823 | 2/1996 |
| JP | 8-152659 | 6/1996 |
| JP | 11-072813 | 3/1999 |
| JP | 2000-069353 | 3/2000 |
| JP | 2001-215548 | 8/2001 |
| JP | 2002-094877 | 3/2002 |

OTHER PUBLICATIONS

English Language Abstract of JP 6-178190.
English Language Abstract of JP 8-029823.
English Language Abstract of JP 8-152659.
English Language Abstract of JP 11-072813.
English Language Abstract of JP 2000-069353.
English Language Abstract of JP 2001-215548.
English Language Abstract of JP 2002-094877.

* cited by examiner

*Primary Examiner*—Melissa J Koval
*Assistant Examiner*—Leon W Rhodes
(74) *Attorney, Agent, or Firm*—Greenblum & Bernstein P.L.C.

(57) ABSTRACT

An anti-shake apparatus of a photographing apparatus comprises a hand-shake quantity detector and a controller. The hand-shake quantity detector has a first detector having an angular velocity sensor and has a second detector having an angular displacement sensor. The controller performs an anti-shake operation based on a first angular signal from the first detector and a second angular signal from the second detector.

14 Claims, 11 Drawing Sheets

ANTI-SHAKE APPARATUS

BACKGROUND OF THE INVENTION

1. Field of the Invention

The present invention relates to an anti-shake apparatus for a photographing apparatus, and in particular to the anti-shake apparatus that performs a highly accurate, anti-shake operation by detecting both a low-frequency element and high-frequency element of a hand-shake.

2. Description of the Related Art

An anti-shake apparatus for a photographing apparatus is proposed. The anti-shake apparatus mitigates the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. H08-152659 discloses an anti-shake apparatus for a photographing apparatus that performs an anti-shake operation based on a hand-shake quantity detected by an angular velocity sensor.

However, in the case where the angular velocity sensor is used for detecting a hand-shake quantity, the anti-shake operation is performed without a low-frequency element of the hand-shake quantity, which is removed from the hand-shake quantity by a high-pass filter to reduce the DC element of an output offset.

Therefore, the anti-shake operation can not be performed sufficiently, in particular to when an imaging operation is operated over a long exposure time (with a slow shutter speed) for imaging a photographic subject in low light.

SUMMARY OF THE INVENTION

Therefore, an object of the present invention is to provide an anti-shake apparatus that can detect the hand-shake quantity including a wide range of the frequency element, and can perform a highly accurate, anti-shake operation so that the anti-shake effect can be obtained sufficiently in spite of an extended time exposure operation.

According to the present invention, an anti-shake apparatus of a photographing apparatus comprises a hand-shake quantity detector and a controller.

The hand-shake quantity detector has a first detector having an angular velocity sensor and has a second detector having an angular displacement sensor.

The controller performs an anti-shake operation based on a first angular signal from the first detector and a second angular signal from the second detector.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiment shown in the drawings. In the embodiment, the photographing apparatus 1 is a digital camera. A photographing lens (not depicted) that is included in lens barrel 2 of the photographing apparatus 1 has an optical axis O.

Figure 1:
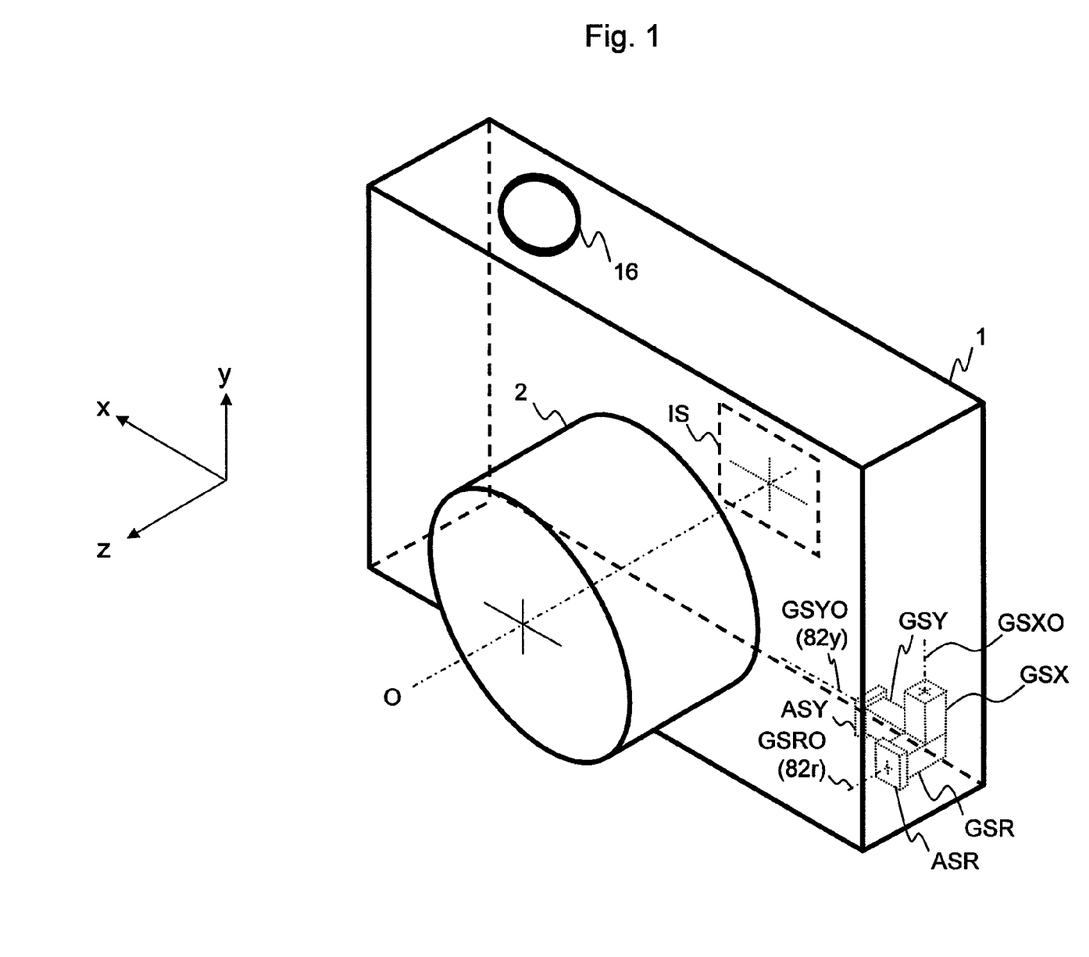
FIG. 1 is a perspective view of a photographing apparatus of the embodiment, viewed from the front side of the photographing apparatus.

In order to explain the direction in this embodiment, a first direction x, a second direction y, and a third direction z are defined (see FIG. 1). The first direction x is a horizontal direction which is perpendicular to the optical axis O. The second direction y is a vertical direction which is perpendicular to the optical axis O and the first direction x. The third direction z is a horizontal direction which is parallel to the optical axis O and perpendicular to both the first direction x and the second direction y.

Figure 2:
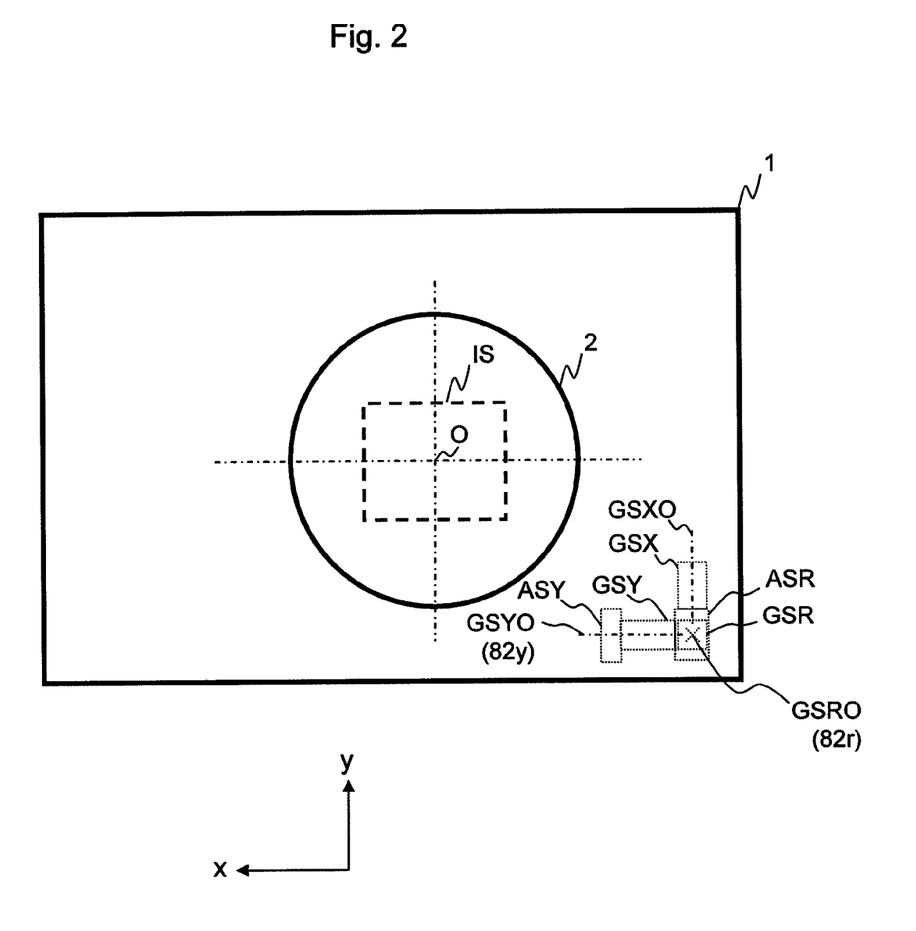
FIG. 2 is a front view of the photographing apparatus.
Figure 3:
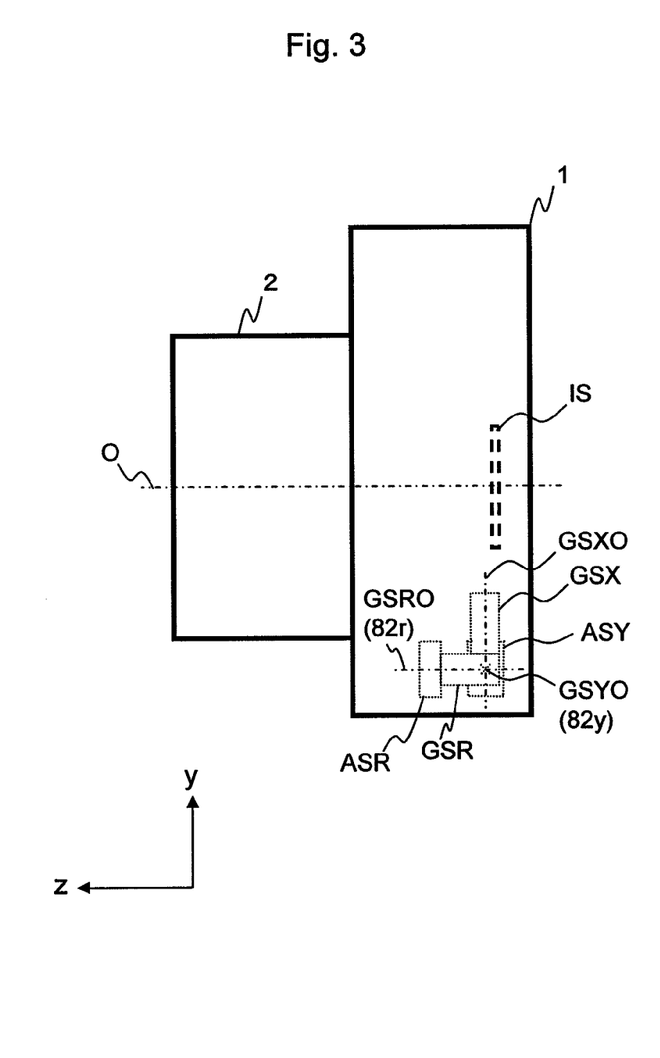
FIG. 3 is a side view of the photographing apparatus.
Figure 4:
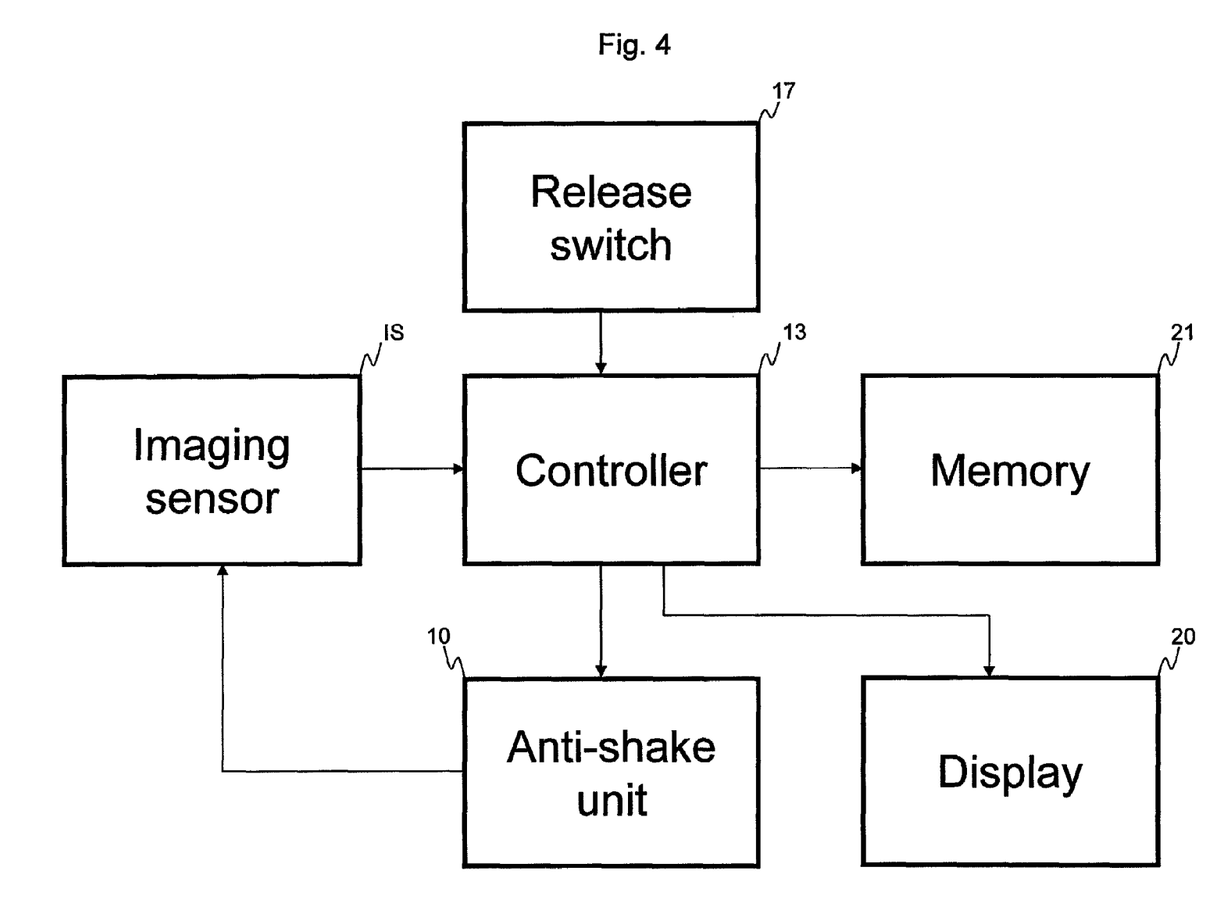
FIG. 4 is a construction diagram of the photographing apparatus.

The photographing apparatus 1 has a lens barrel 2, a release button 16, and an imaging sensor IS (see FIGS. 1 to 3). The photographing apparatus 1 has an anti-shake unit 10, a controller 13, a release switch 17, a display 20, and a memory 21 (see FIGS. 4 and 5).

The photographic subject image is captured as an optical image through the photographing lens by the imaging sensor IS, such as a CCD etc., so that the image, which is captured, is indicated on the display 20 after an A/D converting operation and an image processing operation have been completed by the controller 13.

Further, the image signal obtained by the imaging operation is stored in the memory 21.

When the release button 16 is half-depressed by the operator, the photometric switch (not depicted) changes to the on state, so that the photometric operation, the AF sensing operation, and the focusing operation are performed.

When the release button 16 is fully-depressed by the operator, the release switch 17 changes to the on state, so that the imaging operation is performed, and the image, which is captured, is stored in the memory 21.

A holding operation is performed by a first hold circuit HLY and a second hold circuit HLR when the photometric switch or the release switch 17 is set to the on state.

The anti-shake unit 10 is an apparatus that mitigates the effect of a hand-shake, by moving a movable unit 15a, by canceling the lag, corresponding to a hand-shake quantity, of a photographic subject image on the imaging surface of the imaging sensor IS, and by stabilizing the photographing subject image that reaches the imaging surface of the imaging sensor IS.

The anti-shake unit 10 has a hand-shake quantity detector 11 that detects the hand-shake quantity of a hand-shake, and a driving unit 15a that moves the movable unit 15a on the xy plane perpendicular to the optical axis O, based on the hand-shake quantity. The movement of the movable unit 15a is based on the quantity of the hand-shake and is performed by the controller 13.

The hand-shake quantity detector 11 has a first detector 11a that detects the hand-shake quantity by using an angular velocity sensor such as a gyro sensor etc., and a second detector 11b that detects the hand-shake quantity by using an inclination sensor.

The controller 13 has a first error amplifier 63, a second error amplifier 64, a third error amplifier 65, a first PID (Proportional, Integral, and Derivative controls) calculating circuit 66, a second PID calculating circuit 67, a third PID calculating circuit 68, a first PWM driver 69, a second PWM driver 70, and a third PWM driver 71.

Figure 6:
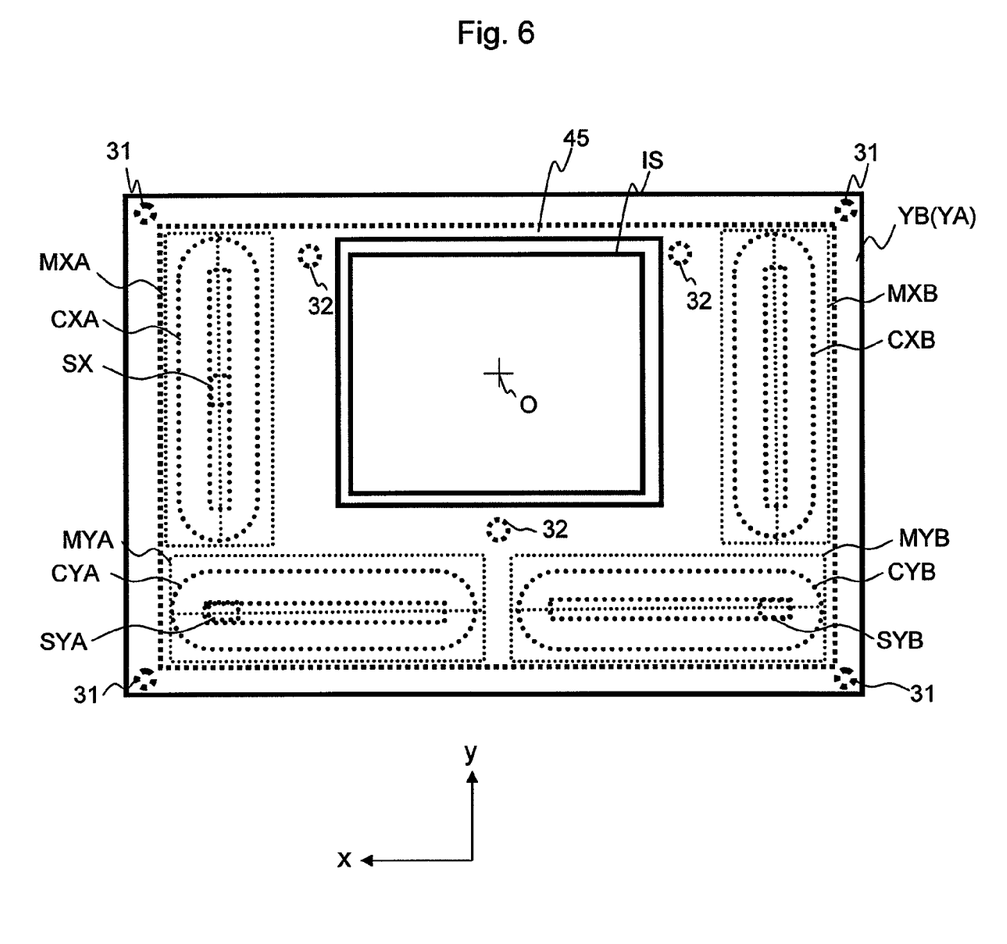
FIG. 6 is a front view of the driving unit of the anti-shake unit.
Figure 7:
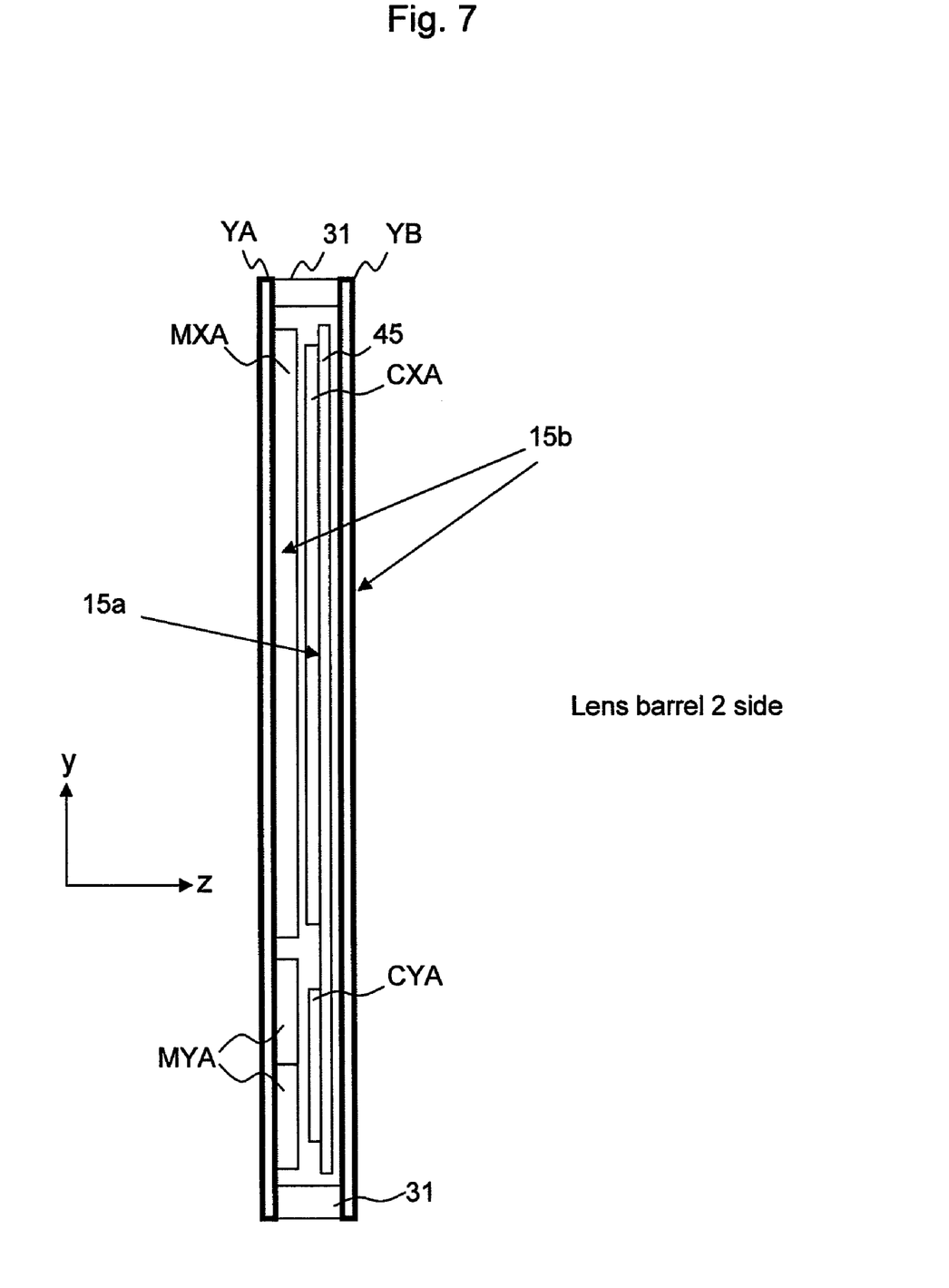
FIG. 7 is a side view of the driving unit of the anti-shake unit, viewed from the first horizontal driving coil side.
Figure 8:
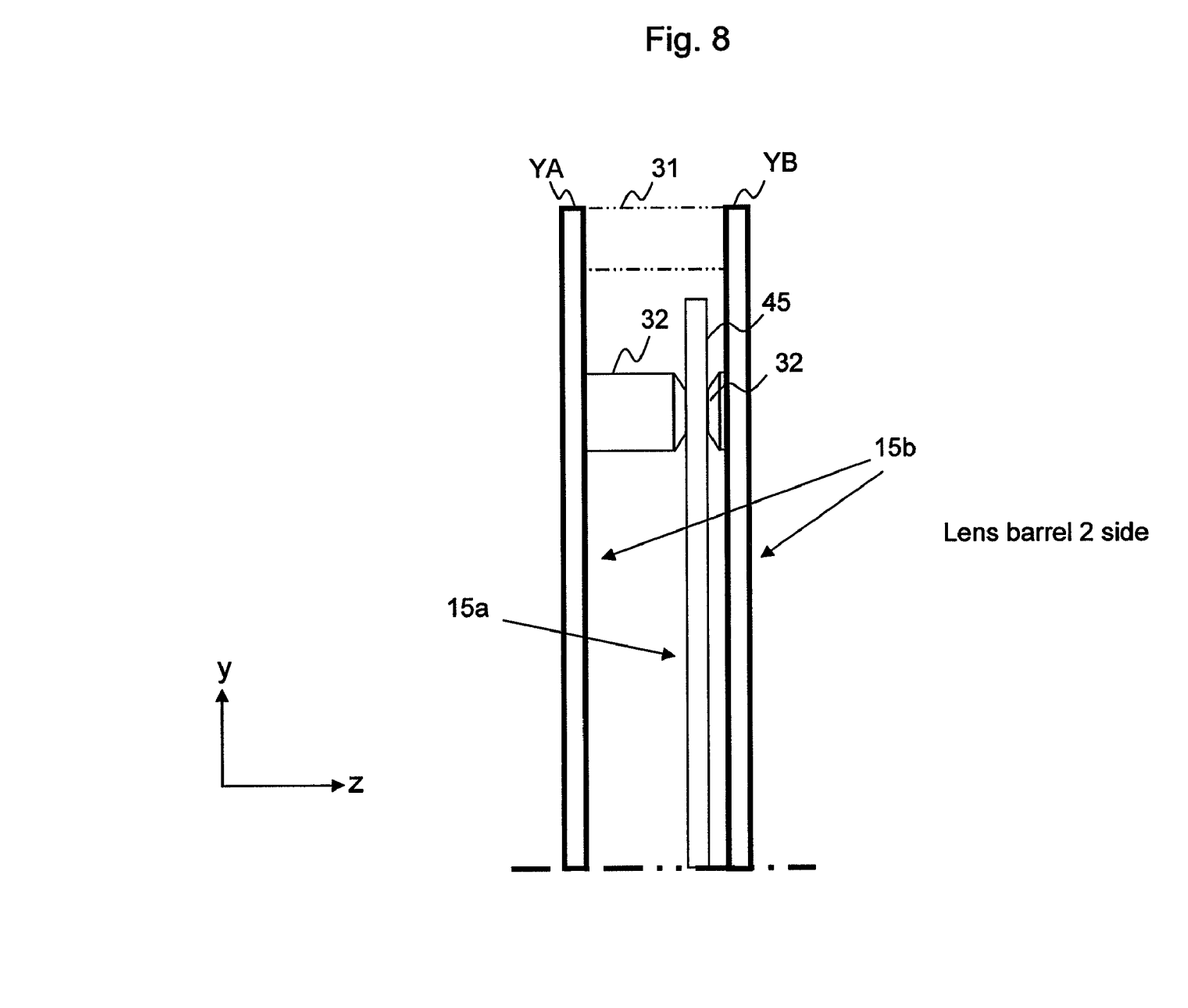
FIG. 8 is a construction diagram of a side part containing the circuit board depicted in FIG. 6.

The driving unit 15 has the movable unit 15a and a fixed unit 15b (see FIGS. 6, 7, and 8). The movable unit 15a is movable toward the fixed unit 15b that is fixed to the photographing apparatus 1, on the xy plane.

The movable unit 15a has a circuit board 45 to which the imaging sensor IS is attached, a first horizontal driving coil CXA, a second horizontal driving coil CXB, a first vertical driving coil CYA, a second vertical driving coil CYB, a first vertical hall sensor SYA, a second vertical hall sensor SYB, and a horizontal hall sensor SX.

The fixed unit 15b has a first yoke YA, a second yoke YB, a coupling support 31, a board support unit 32, a first horizontal driving and position-detecting magnet MXA, a second horizontal driving and position-detecting magnet MXB, a first vertical driving and position-detecting magnet MYA, and a second vertical driving and position-detecting magnet MYB.

Figure 5:
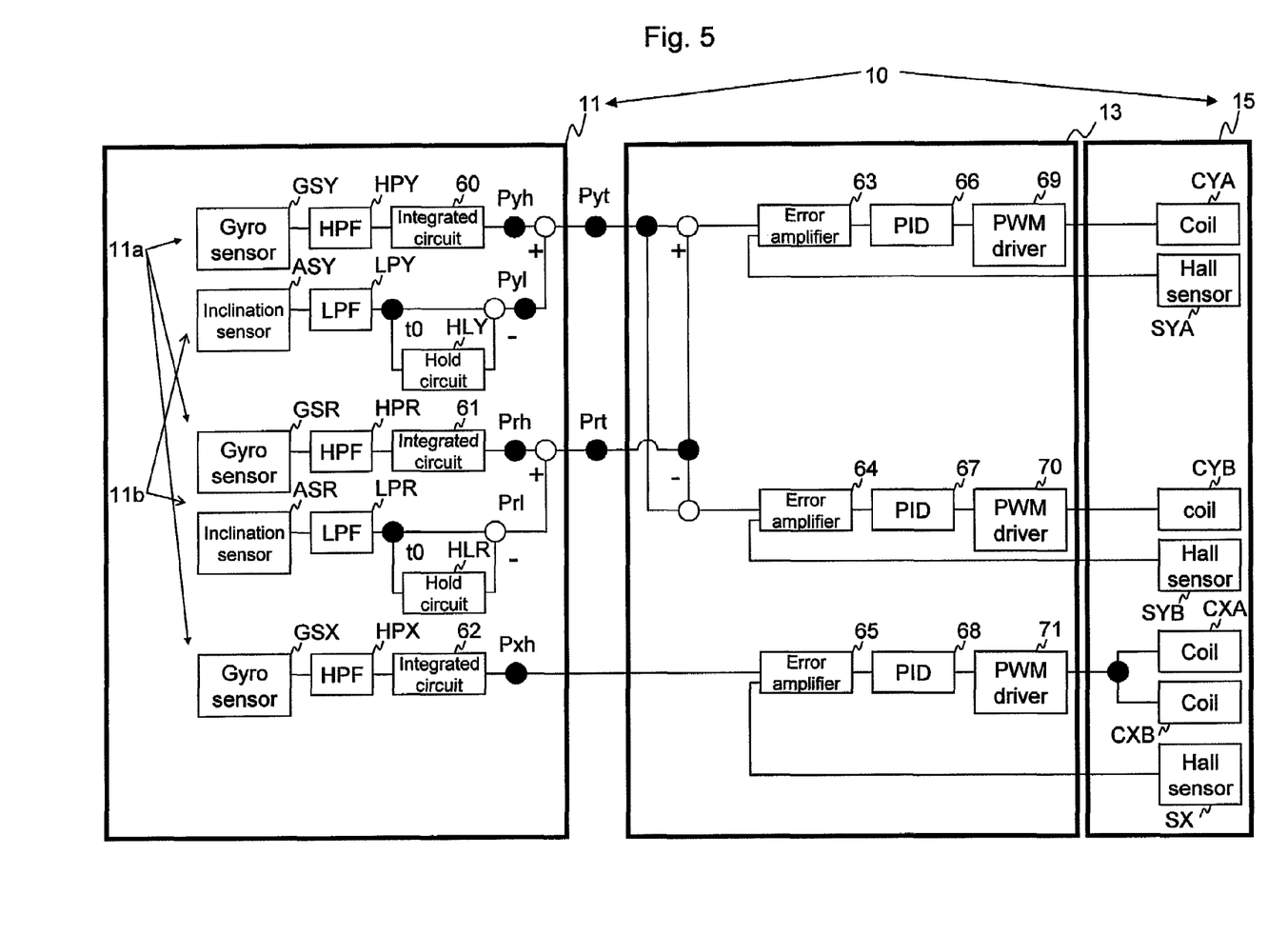
FIG. 5 is a circuit construction diagram of the anti-shake unit of the photographing apparatus.

First of all, a detail of the hand-shake quantity detector 11 is explained (see FIG. 5). The first detector 11a has a pitching gyro sensor GSY, a rolling gyro sensor GSR, a yawing gyro sensor GSX, a first high-pass filter circuit HPY, a second high-pass filter circuit HPR, a third high-pass filter circuit HPX, a first integrated circuit 60, a second integrated circuit 61, and a third integrated circuit 62.

The pitching gyro sensor GSY is arranged where the gyro sensor axis GSYO of the pitching gyro sensor GSY is parallel to the first direction x, and detects the angular velocity of a rotary motion (the pitching motion) of the photographing apparatus 1 about the axis of the first direction x.

The rolling gyro sensor GSR is arranged where the gyro sensor axis GSRO of the rolling gyro sensor GSR is parallel to the third direction z, and detects the angular velocity of a rotary motion (the rolling motion) of the photographing apparatus 1 about the axis of the third direction z.

The yawing gyro sensor GSX is arranged where the gyro sensor axis GSXO of the yawing gyro sensor GSX is parallel to the second direction y, and detects the angular velocity of a rotary motion (the yawing motion) of the photographing apparatus 1 about the axis of the second direction y.

The first high-pass filter circuit HPY removes a low-frequency element of a signal indicating an angular velocity from the pitching gyro sensor GSY (removes a DC offset when a waveform is off-centered in the up and down direction).

The first integrated circuit 60 integrates the high-frequency signal that has had the low-frequency element removed from the first high-pass filter circuit HPY.

Based on the integrated signal that has had the low-frequency element removed, the first integrated circuit 60 generates a first pitching angular signal Pyh as an output value corresponding to the angular hand-shake quantity based on the pitching motion.

The second high-pass filter circuit HPR removes a low-frequency element of a signal indicating an angular velocity from the rolling gyro sensor GSR (removes a DC offset when a waveform is off-centered in the up and down direction).

The second integrated circuit 61 integrates the high-frequency signal that has had the low-frequency element removed from the second high-pass filter circuit HPR.

Based on the integrated signal that has had the low-frequency element removed, the second integrated circuit 61 generates a first rolling angular signal Prh as an output value corresponding to the angular hand-shake quantity based on the rolling motion.

The third high-pass filter circuit HPX removes a low-frequency element of a signal indicating an angular velocity from the yawing gyro sensor GSX (removes a DC offset when a waveform is off-centered in the up and down direction).

The third integrated circuit 62 integrates the high-frequency signal that has had the low-frequency element removed from the third high-pass filter circuit HPX.

Based on the integrated signal that has had the low-frequency element removed, the third integrated circuit 62 generates a fist yawing angular Pxh as an output value corresponding to the angular hand-shake quantity based on a yawing motion. The output value is sent to the third error amplifier 65.

The second detector 11b has a pitching inclination sensor ASY, a rolling inclination sensor ASR, a first low-pass filter circuit LPY, a second low-pass filter circuit LPR, a first hold circuit HLY, and a second hold circuit HLR.

The pitching inclination sensor ASY detects an angle of inclination based on the rotary motion (the pitching motion) of the photographing apparatus 1 about the axis of the first direction x.

The rolling inclination sensor ASR detects an angle of inclination based on the rotary motion (the rolling motion) of the photographing apparatus 1 about the axis of the third direction z.

Details of the pitching inclination sensor ASY and the rolling inclination sensor ASR are described later.

The first low-pass filter circuit LPY removes a high-frequency element of a signal indicating the angle of inclination from the pitching inclination sensor ASY.

The first hold circuit HLY holds an output value from the first low-pass filter circuit LPY at an anti-shake operation base time t0 based on the low-frequency signal that has had the high-frequency element removed.

The anti-shake operation base time t0 is the time when either the control of exposure commences after the photometric switch or the release switch 17 is change to the on state corresponding to the operation of the release button 16; or the anti-shake operation commences after an optional operation for starting the anti-shake operation; or a signal from the pitching inclination sensor ASY is input.

In this embodiment, the anti-shake operation base time t0 is defined as the time when the release switch 17 is changed to the on state after the release button 16 is fully-depressed.

The first low-pass filter circuit LPY and the first hold circuit HLY generate a second pitching angular signal Py1 as an output value corresponding to the angular hand-shake quantity based on the pitching motion. The output value corresponding to the angular hand-shake quantity based on the pitching motion is the difference between the held value by the first hold circuit HLY and an output value generated by the first low-pass filter circuit LPY at current time point t1 after the anti-shake operation base time t0, based on the low-frequency signal that has had the high-frequency element removed.

The second low-pass filter circuit LPR removes a high-frequency element of a signal indicating the angle of inclination from the rolling inclination sensor ASR.

The second hold circuit HLR holds an output value from the second low-pass filter circuit LPR at the anti-shake operation base time t0 based on the low-frequency signal that has had the high-frequency element removed.

The anti-shake operation base time t0 is the time when either the control of exposure commences after the photometric switch or the release switch 17 is changed to the on state corresponding to the operation of the release button 16; or the anti-shake operation commences after an optional operation for starting the anti-shake operation; or a signal from the rolling inclination sensor ASR is input.

The second low-pass filter circuit LPR and the second hold circuit HLR generate a second rolling angular signal Prl as an output value corresponding to the angular hand-shake quantity based on the rolling motion. The output value corresponding to the angular hand-shake quantity based on the rolling motion is the difference between the held value by the second hold circuit HLR and an output value generated by the second low-pass filter circuit LPR at current time point t1 after the anti-shake operation base time t0, based on the low-frequency signal that has had the high-frequency element removed.

It is desirable that the cutoff frequency of the first high-pass filter circuit HPY and the cutoff frequency of the first low-pass filter circuit LPY have the same value.

It is desirable that the cutoff frequency of the second high-pass filter circuit HPR and the cutoff frequency of the second low-pass filter circuit LPR have the same value.

The cutoff frequency of the first high-pass filter circuit HPY and the first low-pass filter circuit LPY is set corresponding to a maximum response frequency of the pitching inclination sensor ASY.

The cutoff frequency of the second high-pass filter circuit HPR and the second low-pass filter circuit LPR is set corresponding to a maximum response frequency of the rolling inclination sensor ASR.

In this embodiment, the cutoff frequencies of the first low-pass filter circuit LPY, the second low-pass filter circuit LPR, the first high-pass filter circuit HPY, and the second high-pass filter circuit HPR are defined as a common value fc (2 to 3 Hz).

To control the movement of the movable unit 15a, the controller 13 uses a signal based on the total value (pitching composite signal Pyt) between the first pitching angular signal Pyh and the second pitching angular signal Pyl to specify the hand-shake quantity based on a rotary motion (pitching motion) about the axis of the first direction x.

To control the movement of the movable unit 15a, the controller 13 uses a signal based on the total value (rolling composite signal Prt) between the first rolling angular signal Prh and the second rolling angular signal Prl to specify the hand-shake quantity based on a rotary motion (rolling motion) about the axis of the third direction z.

To control the movement of the movable unit 15a, the controller 13 uses the yawing angular signal Pxh to specify the hand-shake quantity based on a rotary motion (yawing motion) about the axis of the second direction y.

The pitching composite signal Pyt includes the first pitching angular signal Pyh that has a high-frequency element and the second pitching angular signal Pyl that has a low-frequency element.

Figure 9:
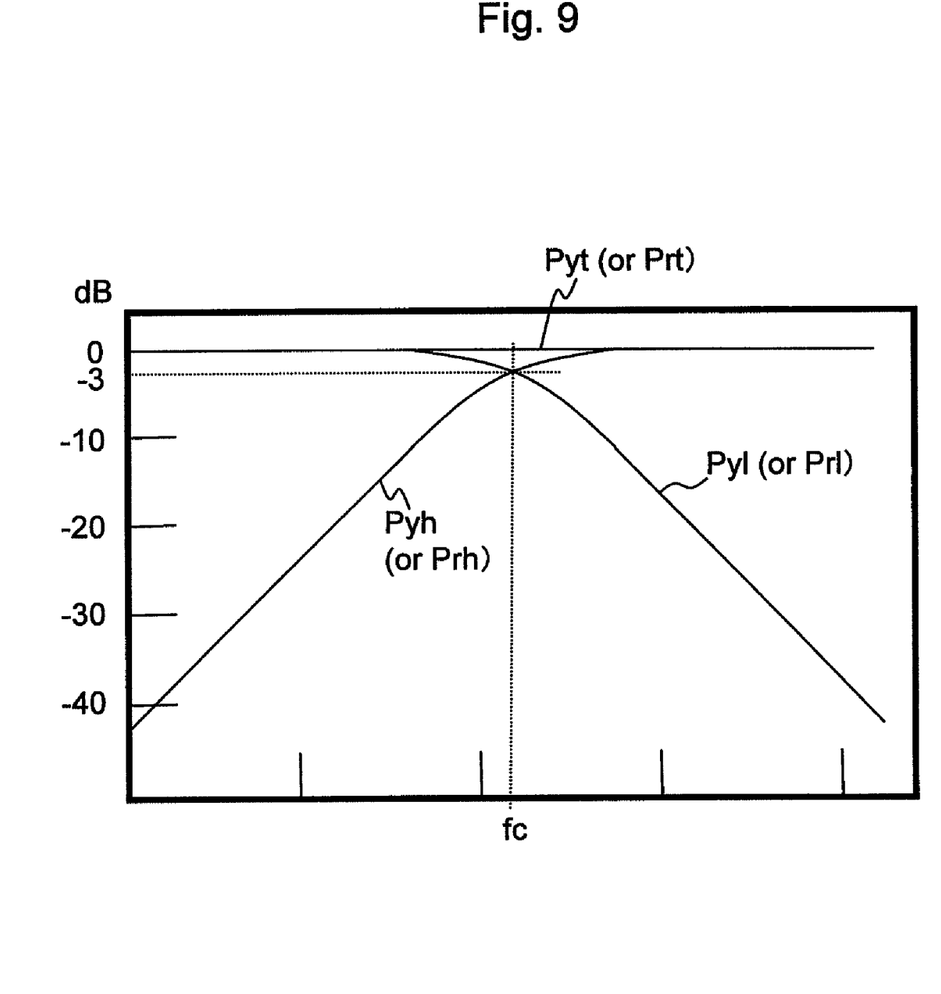
FIG. 9 is a graph that shows characteristics of the pitching composite signal, the first pitching angular signal, and the second pitching angular signal.

Therefore, in this embodiment, compared to when the specified hand-shake quantity is based on only the first pitching angular signal Pyh, the hand-shake quantity can be specified considering a wider frequency range, so that a higher accuracy anti-shake operation can be performed (see FIG. 9).

When utilizing the conventional structure that uses the gyro sensor and the high-pass filter for specifying the hand-shake quantity, the cutoff frequency of the high-pass filter is set relatively low (for example 0.5 Hz) to perform the anti-shake operation in a frequency range as wide as possible.

However, in this embodiment, both a high-pass filter and a low-pass filter are used, so that the frequency range of the signals passed through are shared by both filters. Therefore, the hand-shake quantity can not always be detected in the wider frequency range, but the cutoff frequency fc of the high-pass filter can also be set higher than the cutoff frequency of the high-pass filter in the conventional structure.

Further, in an extended time exposure operation, the error element in the detection of the hand-shake quantity by the gyro sensor can be reduced, and a highly accurate anti-shake operation can be performed by using the inclination sensor and the low-pass filter to detect the hand-shake quantity.

The rolling composite signal Prt includes the first rolling angular signal Prh that has a high-frequency element and the second rolling angular signal Prl that has a low-frequency element.

Therefore, in this embodiment, compared to when the specified hand-shake quantity is specified based on only the first rolling angular signal Prh, the hand-shake quantity can be specified considering a wider frequency range, so that a higher accuracy anti-shake operation can be performed.

The hand-shake that vibrates an image includes a high-frequency element and a low-frequency element. In the case where an angular velocity sensor such as a gyro sensor is used for detecting the hand-shake quantity, the high-pass filter circuit is used for removing the DC offset, so that the low-frequency element of the hand-shake is removed by the high-pass filter.

Further, it is difficult to remove the DC offset accurately under the condition where the photographing apparatus 1 is held by the user's swinging hand. Therefore, the anti-shake operation is performed based on the signal indicating the hand-shake quantity excluding the low-frequency element, and the DC offset is not removed accurately.

Figure 10:
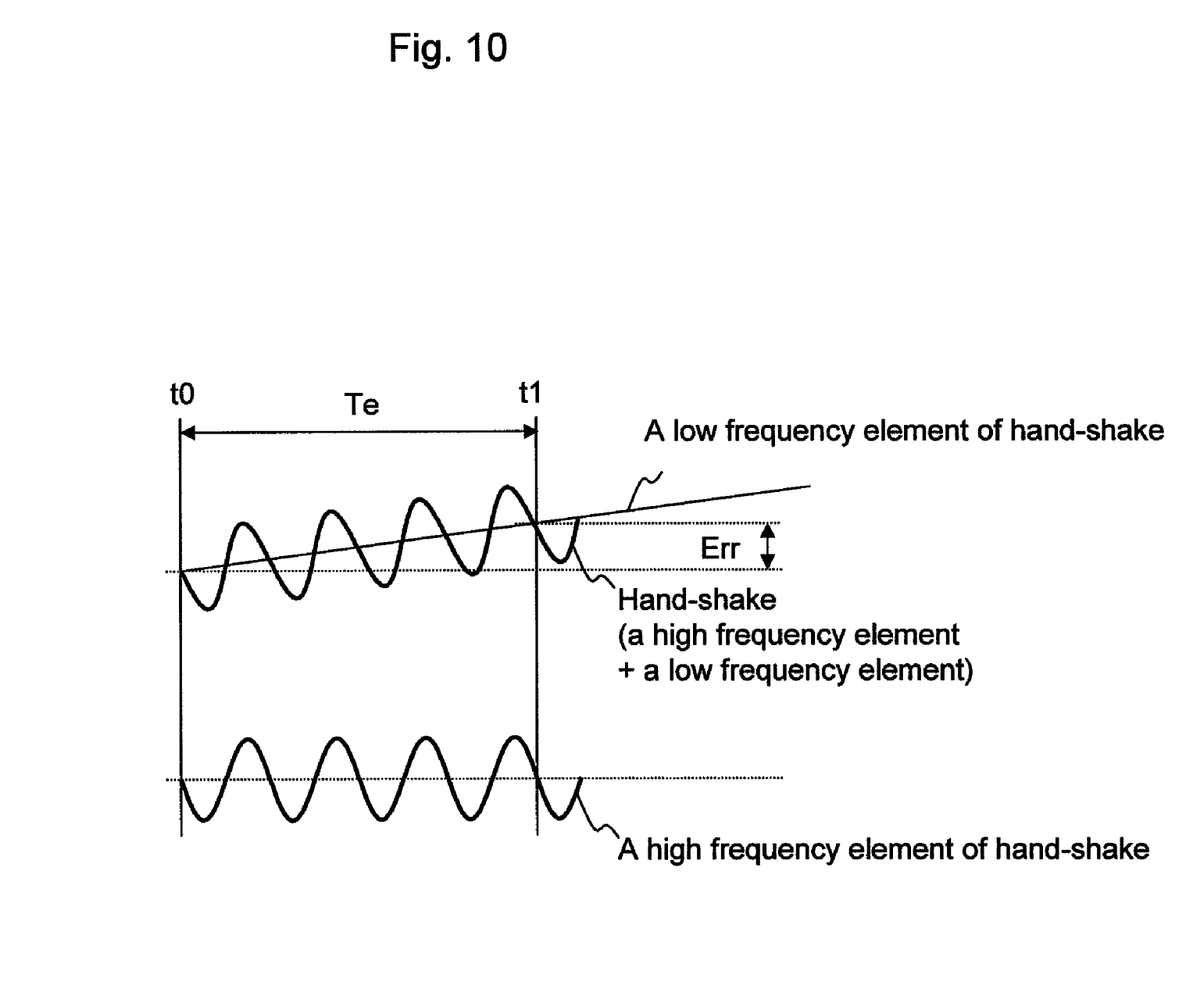
FIG. 10 is a graph that shows a high-frequency element and a low-frequency element of the hand-shake.

Therefore, an error Err based on the low-frequency element of the hand-shake occurs almost in proportion to the exposure time Te (see FIG. 10). The magnitude of the error Err corresponds to the exposure time Te, so that the anti-shake operation can not be performed effectively in an extended time exposure operation (for example, more than $\frac{1}{15}$ second of exposure time).

In this embodiment, the low-frequency element of a hand-shake based on pitching and rolling is detected by using the inclination sensor, so that an anti-shake operation including the effect of the low-frequency element of a hand-shake can be performed.

Further, the signal used for specifying the hand-shake quantity has had the high-frequency element removed by the low-pass filter. Nevertheless, the signal used for specifying the hand-shake quantity that includes the wide range frequency element can be obtained based on the total value between the signal from the inclination sensor used for specifying the hand-shake quantity that includes the low-frequency element and the signal from the angular velocity sensor used for specifying the hand-shake quantity that includes the high-frequency element.

Next, the detail of the controller 13 is explained (see FIG. 5). In the case where a CPU is used as the controller 13, the operation of the integrated circuit, the error amplifier, the PID calculating circuit, and the PWM driver can be performed by using software.

The pitching composite signal Pyt and the rolling composite signal Prt are input to the first error amplifier 63. The pitching composite signal Pyt and the rolling composite signal Prt are also input to the second error amplifier 64.

The total value of the pitching composite signal Pyt and the rolling composite signal Prt, and an output value from the first vertical hall sensor SYA are input to the first error amplifier 63.

The differential value between the pitching composite signal Pyt and the rolling composite signal Prt, and an output value from the second vertical hall sensor SYB are input to the second error amplifier 64.

The yawing angular signal Pxh is input to the third error amplifier 65.

The first error amplifier 63 compares the total value of the pitching composite signal Pyt and the rolling composite signal Prt with the output value of the first vertical hall sensor SYA. Specifically, the first error amplifier 63 calculates a differential value between this total value of the composite signals Pyt and Prt and this output value of the hall sensor SYA.

The second error amplifier 64 compares the differential value between the pitching composite signal Pyt and the rolling composite signal Prt with the output value of the second vertical hall sensor SYB. Specifically, the second error amplifier 64 calculates a differential value between this differential value of the composite signals Pyt and Prt and this output value of the hall sensor SYB.

The third error amplifier 65 compares (calculates) the differential value between the yawing angular signal Pxh and the output value of the horizontal hall sensor SX.

The first PID calculating circuit 66 performs the PID calculation based on an output value of the first error amplifier 63.

The second PID calculating circuit 67 performs the PID calculation based on an output value of the second error amplifier 64.

Specifically, the first PID calculating circuit 66 computes a voltage value to supply to the first vertical driving coil CYA to generate a PWM pulse duty ratio that will effectively minimize the differential value between the total integrated value of the composite signals Pyt and Prt and the output value of the hall sensor SYA (effectively minimizing the output value of the first error amplifier 63).

The second PID calculating circuit 67 computes a voltage value to supply to the second vertical driving coil CYB to generate a PWM pulse duty ratio that will effectively minimize the differential value between the differential value of the composite signals Pyt and Prt and the output value of the hall sensor SYB (effectively minimizing the output value of the second error amplifier 64).

The first PWM driver 69 applies the PWM pulse based on the effect of the calculation of the first PID calculating circuit 66 to the first vertical driving coil CYA.

The second PWM driver 70 applies the PWM pulse based on the effect of the calculation of the second PID calculating circuit 67 to the second vertical driving coil CYB.

At the first and second vertical driving coils CYA and CYB, driving forces resulting from the application of the PWM pulse occur in the second direction y, so that the movable unit 15a can be moved in the second direction y on the xy plane based on the driving force in the second direction y.

When the driving force that occurs in the first vertical driving coil CYA is different from the driving force that occurs in the second vertical driving coil CYB, the movable unit 15a is rotated on the xy plane based on the differential between the driving forces in the second direction y.

The third PID calculating circuit 68 performs the PID calculation based on an output value of the third error amplifier 65.

Specifically, the third PID calculating circuit 68 computes a voltage value to supply to the first and second horizontal driving coils CXA and CXB to generate a PWM pulse duty ratio that will effectively minimize the differential value between the yawing angular signal Pxh and the output value of the horizontal hall sensor SX (effectively minimizing the output value of the third error amplifier 65).

The third PWM driver 71 applies the PWM pulse based on the effect of the calculation of the third PID calculating circuit 68 to the first and second horizontal driving coils CXA and CXB.

At the first and second horizontal driving coils CXA and CXB, driving forces resulting from the application of the PWM pulse occur in the first direction x, so that the movable unit 15a can be moved in the first direction x on the xy plane based on the driving force in the first direction x.

Next, the detail of the driving unit 15 is explained (see FIGS. 6, 7, and 8). The first horizontal driving coil CXA, the second horizontal driving coil CXB, the first vertical driving coil CYA, the second vertical driving coil CYB, the first vertical hall sensor SYA, the second vertical hall sensor SYB, and the horizontal hall sensor SX are attached on the circuit board 45.

The first and second yokes YA and YB are board-shaped magnetic and metallic members. The coupling support 31 is attached between the first and second yokes YA and YB. The circuit board 45 of the movable unit 15a is secured and supported slidably on the xy plane by the board support unit 32 that is fixed to the first and second yokes YA and YB.

The first and second horizontal driving and position-detecting magnets MXA and MXB, and the first and second vertical driving and position-detecting magnets MYA and MYB are attached to the first yoke YA.

A part of the board support unit 32 that makes contact with the circuit board 45 may be a metallic ball. However, a low friction member with little elasticity, for example POM (Polyacetal) resin, is desirable for the part of the board support unit 32 that makes contact with the circuit board 45.

In an initial state before the movable unit 15a starts to move, it is desirable to have the circuit board 45 arranged such that the optical axis O passes through the center of the effective imaging field of the imaging sensor IS, and the sides which make up the edges of the rectangular-shaped effective imaging field are squarely aligned with the axis of the first direction x and the axis of the second direction y.

The imaging sensor IS is arranged on the side of the circuit board 45 that faces the second yoke YB.

The first horizontal driving coil CXA and the horizontal hall sensor SX face the first horizontal driving and position-detecting magnet MXA in the third direction z.

The second horizontal driving coil CXB faces the second horizontal driving and position-detecting magnet MXB in the third direction z.

The first vertical driving coil CYA and the first vertical hall sensor SYA face the first vertical driving and position-detecting magnet MYA in the third direction z.

The second vertical driving coil CYB and the second vertical hall sensor SYB face the second vertical driving and position-detecting magnet MYB in the third direction z.

The N pole and S pole of the first horizontal driving and position-detecting magnet MXA are arranged in the first direction x.

The N pole and S pole of the second horizontal driving and position-detecting magnet MXB are arranged in the first direction x.

The length of the first horizontal driving and position-detecting magnet MXA in the second direction y, is longer in comparison with the effective length of the first horizontal driving coil CXA in the second direction y, so that the first horizontal driving coil CXA and the horizontal driving sensor SX remain in a constant magnetic field throughout the movable unit's 15a full range of motion in the second direction y.

The length of the second horizontal driving and position-detecting magnet MXB in the second direction y, is longer in comparison with the effective length of the second horizontal driving coil CXB in the second direction y, so that the second horizontal driving coil CXB remains in a constant magnetic field throughout the movable unit's 15a full range of motion in the second direction y.

The N pole and S pole of the first vertical driving and position-detecting magnet MYA are arranged in the second direction y.

The N pole and S pole of the second vertical driving and position-detecting magnet MYB are arranged in the second direction y.

The length of the first vertical driving and position-detecting magnet MYA in the first direction x, is longer in comparison with the effective length of the first vertical driving coil CYA in the first direction x, so that the first vertical driving coil CYA and the first vertical hall sensor SYA remain in a constant magnetic field throughout the movable unit's 15a full range of motion in the first direction x.

The length of the second vertical driving and position-detecting magnet MYB in the first direction x, is longer in comparison with the effective length of the second vertical driving coil CYB in the first direction x, so that the second vertical driving coil CYB and the second vertical hall sensor SYB remain in a constant magnetic field throughout the movable unit's 15a full range of motion in the first direction x.

The coil pattern of the first horizontal driving coil CXA has a line segment which is parallel to the second direction y, so that the movable unit 15a, which includes the first horizontal driving coil CXA, moves in the first direction x when a first horizontal electro-magnetic force is applied.

The first horizontal electro-magnetic force occurs on the basis of the current that flows through the first horizontal driving coil CXA and the magnetic field of the first horizontal driving and position-detecting magnet MXA.

The coil pattern of the second horizontal driving coil CXB has a line segment which is parallel to the second direction y, so that the movable unit 15a, which includes the second horizontal driving coil CXB, moves in the first direction x when a second horizontal electro-magnetic force is applied.

The second horizontal electro-magnetic force occurs on the basis of the current that flows through the second horizontal driving coil CXB and the magnetic field of the second horizontal driving and position-detecting magnet MXB.

The coil pattern of the first vertical driving coil CYA has a line segment which is parallel to the first direction x, so that the movable unit 15a, which includes the first vertical driving coil CYA, moves in the second direction y when a first vertical electro-magnetic force is applied.

The first vertical electro-magnetic force occurs on the basis of the current that flows through the first vertical driving coil CYA and the magnetic field of the first vertical driving and position-detecting magnet MYA.

The coil pattern of the second vertical driving coil CYB has a line segment which is parallel to the first direction x, so that the movable unit 15a, which includes the second vertical driving coil CYB, moves in the second direction y when a second vertical electro-magnetic force is applied.

The second vertical electro-magnetic force occurs on the basis of the current that flows through the second vertical driving coil CYB and the magnetic field of the second vertical driving and position-detecting magnet MYB.

The first and second vertical hall sensors SYA and SYB are magneto-electric converting elements (magnetic field change-detection elements) utilizing the Hall effect, and are used for detecting the position of the movable unit 15a in the second direction y.

The horizontal hall sensor SX is a magneto-electric converting element (a magnetic field change-detection element) utilizing the Hall effect, and is used for detecting the position of the movable unit 15a in the first direction x.

The first vertical hall sensor SYA is arranged inside of the first vertical driving coil CYA, the second vertical hall sensor SYB is arranged inside of the second vertical driving coil CYB, and the horizontal hall sensor SX is arranged inside of the first horizontal driving coil CXA.

The second yoke YB is arranged on the side of the driving unit that is nearest to the lens barrel 2, compared to the first yoke YA.

The shape of the second yoke YB includes a hollow part facing the imaging sensor IS in the third direction z to enable incident light to reach the effective imaging filed of the imaging sensor IS.

The first and second yokes YA and YB prevent the magnetic field of the first and second horizontal driving and position-detecting magnets MXA and MXB and the first and second vertical driving and position-detecting magnets MYA and MYB from diffusing, increase the magnetic-flux density between the first horizontal driving coil CXA and horizontal hall sensor SX and the first horizontal driving and position-detecting magnet MXA, increase the magnetic-flux density between the second horizontal driving coil CXB and the second horizontal driving and position-detecting magnet MXB, increase the magnetic-flux density between the first vertical driving coil CYA and first vertical hall sensor SYA and the first vertical driving and position-detecting magnet MYA, and increase the magnetic-flux density between the second vertical driving coil CYB and second vertical hall sensor SYB and the second vertical driving and position-detecting magnet MYB.

Figure 11:
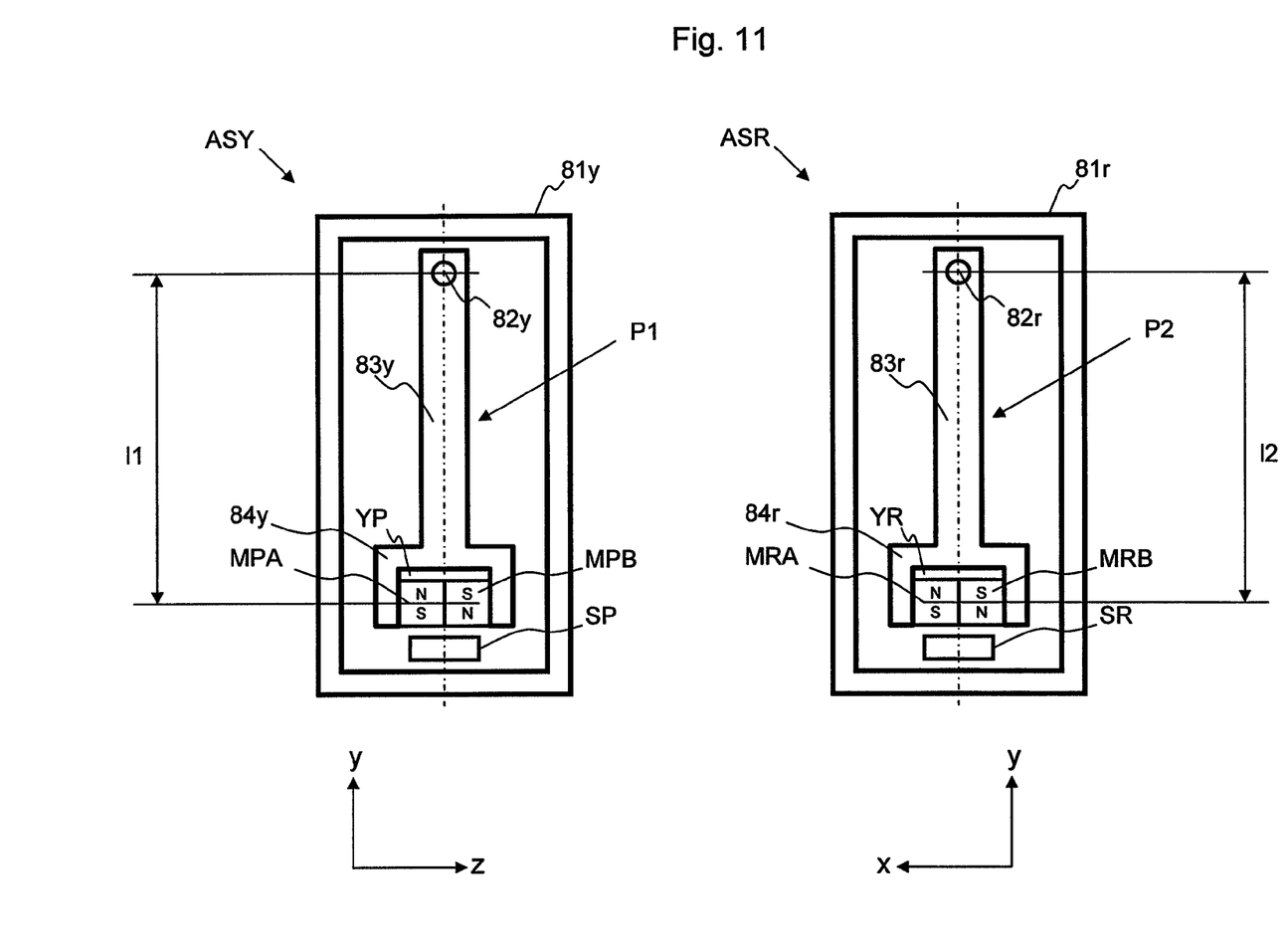
FIG. 11 is a construction diagram of the pitching inclination sensor and the rolling inclination sensor.

Next, the detail of the pitching inclination sensor ASY and the rolling inclination sensor ASR is explained (see FIG. 11).

The pitching inclination sensor ASY has a first sealed exterior 81y, a first pendulum axis 82y, a first pendulum arm 83y, a first weight 84y, a first pitching inclination angular detection magnet MPA, a second pitching inclination angular detection magnet MPB, a pitching inclination angular detection yoke YP, and a pitching inclination angular detection hall sensor SP.

The rolling inclination sensor ASR has a second sealed exterior 81r, a second pendulum axis 82r, a second pendulum arm 83r, a second weight 84r, a first rolling inclination angular detection magnet MRA, a second rolling inclination angular detection magnet MRB, a rolling inclination angular detection yoke YR, and a rolling inclination angular detection hall sensor SR.

The first pendulum axis 82y, the first pendulum arm 83y, the first weight 84y, the first and second pitching inclination angular detection magnets MPA and MPB, the pitching inclination angular detection yoke YP and the pitching inclination angular detection hall sensor SP are stored in the first sealed exterior 81y.

Within the first sealed exterior 81y, a silicon oil etc. is filled under the condition that a first pendulum P1, consisting of the first pendulum arm 83y, the first weight 84y, the first and second pitching inclination angular detection magnets MPA and MPB, and the pitching inclination angular detection yoke YP, can be swung in a almost critical damping state.

The first pendulum axis 82y is parallel to the first direction x in accord with the gyro sensor axis GSYO.

The first pendulum arm 83y is supported by the first pendulum axis 82y under the condition where the first pendulum arm 83y can be swung from the center of the first pendulum axis 82y.

The first weight 84y is attached to the first arm 83y. The pitching inclination angular detection yoke YP and first and second pitching inclination angular detection magnets MPA and MPB are attached to the first weight 84y.

In an initial state where the first pendulum P1 has not started to swing and remains motionless in the center of the swing range, the N pole and S pole of the first pitching inclination angular detection magnet MPA are arranged in the second direction y.

In an initial state where the first pendulum P1 has not started to swing and remains motionless in the center of the swing range, the N pole and S pole of the second pitching inclination angular detection magnet MPB are arranged in the second direction y, and opposite to the arrangement of the N pole and S pole of the first pitching inclination angular detection magnet MPA.

In the initial state where the first pendulum P1 has not started to swing and remains motionless in the center of the swing range, the first and second pitching inclination angular detection magnets MPA and MPB are arranged in the third direction z.

The position of the pitching inclination angular detection hall sensor SP is fixed inside of the first sealed exterior 81y so that it faces the first and second pitching inclination angular detection magnets MPA and MPB in the second direction y.

In order to perform an accurate position-detecting operation based on the linear output-change (linearity) of the hall sensor, it is desirable to position the pitching inclination angular detection hall sensor SP so that it faces an intermediate area between the first and second pitching inclination angular detection magnets MPA and MPB in the third direction z when the first pendulum P1 is at rest in its initial stat. In this position, the position-detecting operation can be performed utilizing the pendulum's full range of motion.

The pitching inclination angular detection hall sensor SP is a magneto-electric converting element (a magnetic field change-detection element) utilizing the Hall effect, and is used for detecting an inclination angle caused by a pitching motion.

The inclination angle caused by the pitching motion is detected based on the quantity of a magnetic field between the magnet and the hall sensor that changes corresponding to a movement (swing) of the first pendulum P1 caused by the pitching motion.

A first arm length l1 of the first pendulum arm 83y is about 1 cm. In the case that the first arm length l1 is 1 cm, a first frequency (a maximum value of a response frequency) f1 of the first pendulum P1 is about 5 Hz ($f1 = 1 \div \{2\pi \times (1 \div g)^{1/2}\}$). The g is the acceleration of gravity.

A maximum value of the frequency of the hand-shake is about 12 to 13 Hz, which is larger than the first frequency f1 of the first pendulum P1.

The pitching inclination sensor ASY detects a low-frequency element of the hand-shake that is equal to or less than the first frequency f1.

It is desirable to have the cutoff frequency fc of the first high-pass filter circuit HPY and the first low-pass filter circuit LPY set at a value less than the first frequency f1 (2 to 3 Hz).

The second pendulum axis 82r, the second pendulum arm 83r, the second weight 84r, the first and second rolling inclination angular detection magnets MRA and MRB, the rolling inclination angular detection yoke YR and the rolling inclination angular detection hall sensor SR are stored in the second sealed exterior 81r.

Within the second sealed exterior 81r, a silicon oil etc. is filled under the condition that a second pendulum P2, consisting of the second pendulum arm 83r, the second weight 84r, the first and second rolling inclination angular detection magnets MRA and MRB, and the rolling inclination angular detection yoke YR, can be swung in a almost critical damping state.

The second pendulum axis 82r is parallel to the third direction z in accord with the gyro sensor axis GSRO.

The second pendulum arm 83r is supported by the second pendulum axis 82r under the condition where the second pendulum arm 83r can be swung from the center of the second pendulum axis 82r.

The second weight 84r is attached to the second arm 83r. The rolling inclination angular detection yoke YR and first and second rolling inclination angular detection magnets MRA and MRB are attached to the second weight 84r.

In an initial state where the second pendulum P2 has not started to swing and remains motionless in the center of the swing range, the N pole and S pole of the first rolling inclination angular detection magnet MRA are arranged in the second direction y.

In an initial state where the second pendulum P2 has not started to swing and remains motionless in the center of the swing range, the N pole and S pole of the second rolling inclination angular detection magnet MRB are arranged in the second direction y, and opposite to the arrangement of the N pole and S pole of the first rolling inclination angular detection magnet MRA.

In the initial state where the second pendulum P2 has not started to swing and remains motionless in the center of the swing range, the first and second rolling inclination angular detection magnets MRA and MRB are arranged in the first direction x.

The position of the rolling inclination angular detection hall sensor SR is fixed inside of the second sealed exterior 81r so that it faces the first and second rolling inclination angular detection magnets MRA and MRB in the second direction y.

In order to perform an accurate position-detecting operation based on the linear output-change (linearity) of the hall sensor, it is desirable to position the rolling inclination angular detection hall sensor SR so that it faces an intermediate area between the first and second rolling inclination angular detection magnets MRA and MRB in the first direction x when the second pendulum P2 is at rest in its initial state. In this position, the position-detecting operation can be performed utilizing the pendulum's full range of motion.

The rolling inclination angular detection hall sensor SR is a magneto-electric converting element (a magnetic field change-detection element) utilizing the Hall effect, and is used for detecting an inclination angle caused by a rolling motion.

The inclination angle caused by the rolling motion is detected based on the quantity of a magnetic field between the magnet and the hall sensor that changes corresponding to a movement (swing) of the second pendulum P2 caused by the rolling motion.

A second arm length 12 of the second pendulum arm 83r is about 1 cm. In the case that the second arm length 12 is 1 cm, a second frequency (a maximum value of a response frequency) f2 of the second pendulum P2 is about 5 Hz (f2=1÷{2π×(1÷g)$^{1/2}$}. The g is the acceleration of gravity.

A maximum value of the frequency of the hand-shake is about 12 to 13 Hz, which is larger than the second frequency f2 of the second pendulum P2.

The rolling inclination sensor ASR detects a low-frequency element of the hand-shake that is equal to or less than the second frequency f2.

It is desirable to have the cutoff frequency fc of the second high-pass filter circuit HPR and the second low-pass filter circuit LPR set at a value less than the second frequency f2 (2 to 3 Hz).

In this embodiment, it is explained that the circuit board 45 which includes the imaging sensor IS is fastened to the movable unit 15a and is movable on the xy plane. However, in the case where the imaging sensor IS is fixed (not movable) and a hand-shake correcting lens (not depicted) is fastened to the movable unit 15a and is movable on the xy plane, the same effect can be obtained.

Further, it is explained that the hall sensor is used for position detecting as the magnetic field change-detection element, however, another detection element may be used for position detecting on purposes. Specifically, the detection element may be an MI (Magnetic Impedance) sensor, in other words a high-frequency carrier-type magnetic field sensor, or a magnetic resonance-type magnetic field detection element, or an MR (Magneto-Resistance effect) element. When one of either the MI sensor, the magnetic resonance-type magnetic field detection element, or the MR element is used, the information regarding the position of the movable unit can be obtained by detecting the magnetic field change, similar to using the hall sensor.

Further, it is explained that the inclination (angular) sensor that detects the inclination angle of the pendulum is used as the angular sensor, however, another angular sensor may be used.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2006-042565 (filed on Feb. 20, 2006) which is expressly incorporated herein by reference, in this entirety.

The invention claimed is:

1. An anti-shake apparatus of a photographing apparatus, comprising:
   a hand-shake quantity detector that has a first detector having an angular velocity sensor and that has a second detector having an angular displacement sensor, said angular displacement sensor comprising an inclination angular sensor that detects an inclination angle of a pendulum, said first detector has an integration unit and a high-pass filter unit that removes a low-frequency component of a signal output from said angular velocity sensor to obtain a high-frequency signal from which said low-frequency component has been removed, and said second detector has a hold unit and a low-pass filter unit that removes a high-frequency component of a signal output from said angular displacement sensor to obtain a low-frequency signal from which said high-frequency component has been removed,
   said integration unit integrating said high-frequency signal and generating a first angular signal based on the integrated high-frequency signal; and
   said hold unit holding a value output from said low-pass filter unit based on said low-frequency signal at an anti-shake operation base time and outputting a second angular signal based on a differential between the value held by said hold unit and a value output from said low-pass filter unit based on said low-frequency signal at a time after said anti-shake operation base time,
   wherein a cutoff frequency of said high-pass filter unit and a cutoff frequency of said low-pass filter unit have the same value;
   a controller that performs an anti-shake operation based on said first angular signal from said first detector and said second angular signal from said second detector, said controller specifies a hand-shake quantity based on a total value between said first angular signal and said second angular signal, and performs said anti-shake operation based on said total value.

2. The anti-shake apparatus according to claim 1, wherein said cutoff frequency of said high-pass filter unit and said low-pass filter unit is set to a value corresponding to a maximum value of a response frequency of said angular displacement sensor.

3. The anti-shake apparatus according to claim 2, wherein said cutoff frequency of said high-pass filter unit and said low-pass filter unit is within a range of from 2 to 3 Hz.

4. The anti-shake apparatus according to claim 1, wherein said pendulum has a magnet and a hall sensor that detects a quantity of a magnetic field, between said magnet and said hall sensor, that changes in correspondence with a swing of said pendulum.

5. The anti-shake apparatus according to claim 1, wherein said angular velocity sensor has a yawing angular velocity sensor and a pitching angular velocity sensor, and said angular displacement sensor has at least one of either a yawing angular sensor or a pitching angular sensor;
   said yawing angular velocity sensor detecting an angular velocity based on a yawing motion;
   said pitching angular velocity sensor detecting an angular velocity based on a pitching motion;
   said yawing angular sensor detecting an inclination angle based on said yawing motion; and
   said pitching angular sensor detecting an inclination angle based on said pitching motion.

6. The anti-shake apparatus according to claim 5, wherein said angular velocity sensor has a rolling angular velocity sensor that detects an angular velocity based on a rolling motion, and said angular displacement sensor has at least one of said yawing angular sensor, said pitching angular sensor and a rolling angular sensor that detects an inclination angle based on said rolling motion.

7. A photographing apparatus comprising:
   a hand-shake quantity detector that has a first detector having an angular velocity sensor and that has a second detector having an angular displacement sensor, said angular displacement sensor comprising an inclination angular sensor that detects an inclination angle of a pendulum, said first detector has an integration unit and a high-pass filter unit that removes a low-frequency component of a signal output from said angular velocity sensor to obtain a high-frequency signal from which said low-frequency component has been removed, and said second detector has a hold unit and a low-pass filter unit that removes a high-frequency component of a signal output from said angular displacement sensor to obtain a low-frequency signal from which said high-frequency component has been removed, said integration unit integrating said high-frequency signal and generating a first angular signal based on the integrated high-frequency signal; and said hold unit holding a value output from said low-pass filter unit based on said low-frequency signal at an anti-shake operation base time and outputting a second angular signal based on a differential between the value held by said hold unit and a value output from said low-pass filter unit based on said low-frequency signal at a time after said anti-shake operation base time, wherein a cutoff frequency of said high-pass filter unit and a cutoff frequency of said low-pass filter unit have the same value;

a controller that performs an anti-shake operation based on said first angular signal from said first detector and said second angular signal from said second detector said controller specifies a hand-shake quantity based on a total value between said first angular signal and said second angular signal, and performs said anti-shake operation based on said total value.

8. The photographing apparatus according to claim 7, further comprising an operating unit; and said anti-shake operation base time being set in correspondence with an operation of said operation unit.

9. The photographing apparatus according to claim 8, said operation unit is a release button, and said anti-shake operation base time is a time when a control of exposure is started in response to operation of said release button.

10. The anti-shake apparatus according to claim 7, wherein said cutoff frequency of said high-pass filter unit and said low-pass filter unit is set to a value corresponding to a maximum value of a response frequency of said angular displacement sensor.

11. The anti-shake apparatus according to claim 10, wherein said cutoff frequency of said high-pass filter unit and said low-pass filter unit is within a range of from 2 to 3 Hz.

12. The anti-shake apparatus according to claim 7, wherein said pendulum has a magnet and a hall sensor that detects a quantity of a magnetic field, between said magnet and said hall sensor, that changes in correspondence with a swing of said pendulum.

13. The anti-shake apparatus according to claim 7, wherein said angular velocity sensor has a yawing angular velocity sensor and a pitching angular velocity sensor, and said angular displacement sensor has at least one of either a yawing angular sensor or a pitching angular sensor;

said yawing angular velocity sensor detecting an angular velocity based on a yawing motion;

said pitching angular velocity sensor detecting an angular velocity based on a pitching motion;

said yawing angular sensor detecting an inclination angle based on said yawing motion; and said pitching angular sensor detecting an inclination angle based on said pitching motion.

14. The anti-shake apparatus according to claim 13, wherein said angular velocity sensor has a rolling angular velocity sensor that detects an angular velocity based on a rolling motion, and said angular displacement sensor has at least one of said yawing angular sensor, said pitching angular sensor and a rolling angular sensor that detects an inclination angle based on said rolling motion.

* * * * *